Patented Oct. 29, 1929

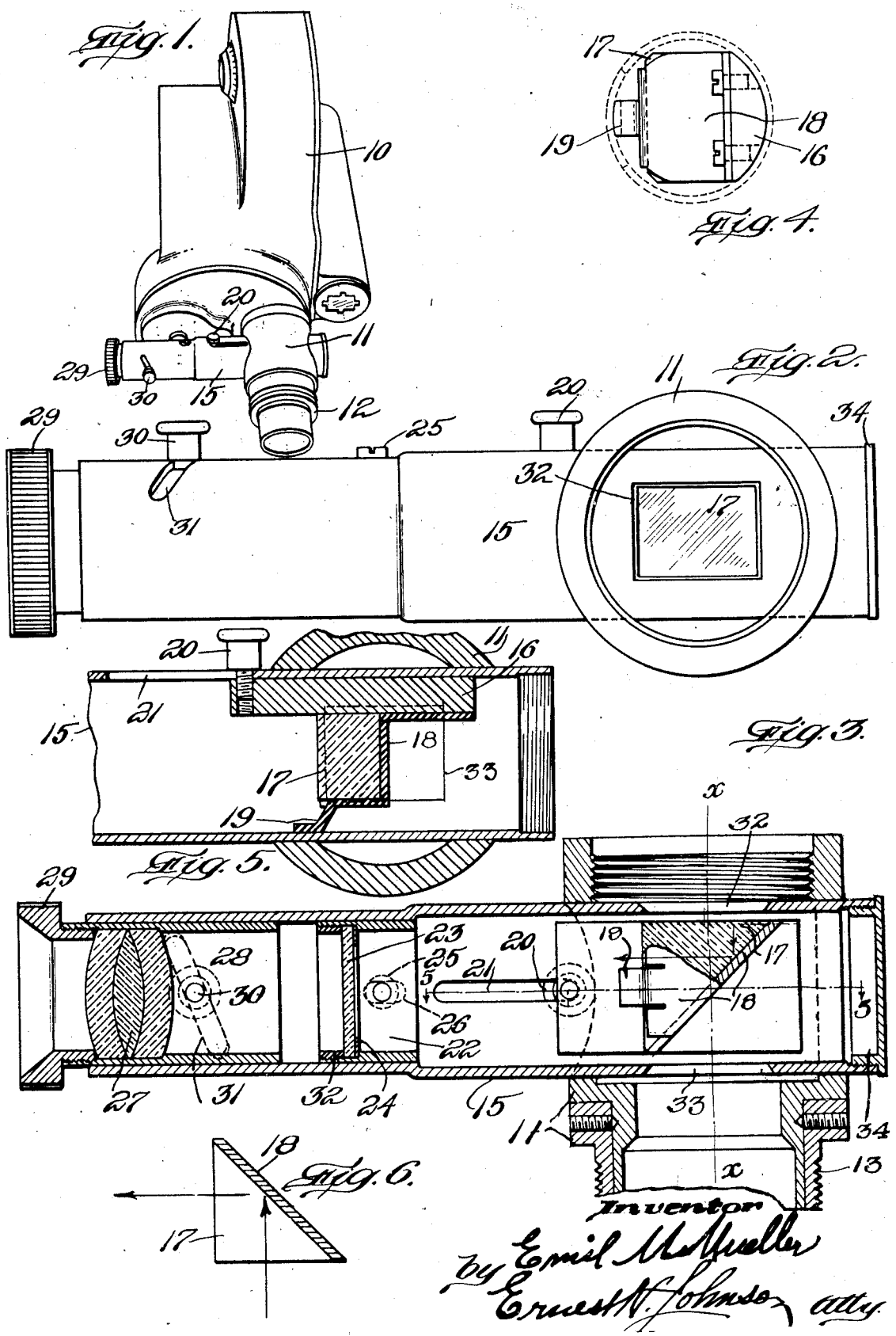

1,733,511

UNITED STATES PATENT OFFICE

EMIL M. MUELLER, OF NEW YORK, N. Y., ASSIGNOR TO C. P. GOERZ AMERICAN OPTICAL COMPANY, OF NEW YORK, N. Y., A CORPORATION OF NEW YORK

CAMERA

Application filed November 11, 1927. Serial No. 232,638.

This invention relates to cameras and it has for its object to improve the construction thereof whereby the same may be readily, conveniently and accurately sighted and focused.

Some motion picture cameras, as heretofore constructed, have no means for viewing the image produced by the camera lens but in lieu thereof are provided with a focusing scale for use by the photographer in adjusting the lens to the proper focus, and with a finder device attached to the side of the camera for use in sighting the latter and positioning the image; that is, for positioning the object or objects to be included in the picture properly with relation to the filmgate or exposure opening of the camera. While a focusing scale may suffice for lenses of comparatively short focal length, particularly when the objects are at comparatively long distances from the camera, it becomes more and more difficult to obtain a critically sharp focus by means of such scales when using long focus lenses, or when the objects to be photographed are comparatively near the camera. Also, it is impossible to correctly or accurately sight the camera, or place the image in relation to the exposure opening, by means of the side finder device on the camera because of the fact that the optical axis of the finder device is necessarily off-set with respect to the axis of the photographic lens and the fact that the image seen in the finder is different from that produced within the camera by the photographic lens and defined by the exposure opening, and this difference varies with change in the distance between the object and the camera.

The present invention avoids and obviates these objections and limitations and provides a camera having optical sighting or finder means whose axis is coincident with the optical axis of the photographic lens of the camera so that both the focus and image or picture as presented by said finder means are identical, or substantially identical, with the focus and image or picture as produced by the lens on the film strip, film, or the like, within the camera, under all conditions of adjustment of said lens.

In the preferred embodiment of my invention herein shown, the sighting or finder means includes a reflector adjustably mounted within the camera so as to be movable either into an operative position immediately back of the photographic lens between the latter and the film strip, film or the like, or into an inoperative position off-set at one side of the path of the light rays where it is at one side of the axis of the lens and does not obstruct the passage of said rays from the lens to the film strip, film or the like.

This reflector, when in its operative position, is obliquely disposed with relation to the axis of the lens and intercepts the light rays that have passed through the latter, reflecting the same laterally through an observation window or port. This observation window or port is preferably provided with a pane of ground glass or the like on which appears the image or picture as seen by the lens of the camera. If desired or necessary a magnifying lens may be provided just outside of the ground glass as an aid to the photographer in viewing the image on the latter. Other features of my invention are hereinafter pointed out.

In the accompanying drawings:—

Figure 1 is a perspective view of a motion picture camera constructed in accordance with my invention.

Figure 2 is a front elevation, enlarged, of the body portion of the lens holder of the camera shown in Fig. 1.

Figure 3 is a central longitudinal sectional view of the parts shown in Fig. 2.

Figure 4 is an end view of the prism device hereinafter referred to.

Figure 5 is a section on line 5—5 of Fig. 3.

Figure 6 is a detail of the prism hereinafter described.

Having reference to the accompanying drawings, 10 represents a moving picture camera, 11 the main body portion of the tubular lens holder, and 12 the supplemental focusing lens carrying mounting of the latter. The body 11 is provided at its rear end with external threads 13 whereby it is connected with the camera 10, and at its front end with internal threads 14 to receive the supplemental lens carrying mounting 12.

The body 11 is made with a laterally extending tubular branch 15 serving as a housing and support for a carrier 16, herein shown as a slide, and a prism 17 mounted on said carrier. This branch 15 also provides a focusing and sighting or finder port communicating at its inner end with the interior of the camera.

The carrier 16 inculdes a base or body portion, Figures 4 and 5, fitting against one side of the interior of the tubular branch or extension 15, and to this base portion a prism 17 is fastened by means of a bracket 18 that is secured by screws to the carrier base portion 16. This bracket is made with an arm 19 bearing against the opposite side of the tubular branch or extension 15 whereby the carrier is supported in position therein with provision for sliding movement longitudinally thereof.

Near one end thereof the base 18 is made with a threaded hole that is occupied by the inner threaded end of a thumb screw 20 which projects through a slot 21 provided in branch 15 to the exterior thereof. This screw 20 is used as a handle by means of which the prism carrier is adjusted longitudinally within the branch 15 so that the prism 17 can be positioned coincident with the axis of the photographic lens 12 as shown in the drawings, or slid laterally along the branch 15 from that position into a position within said branch where it is off-set with respect to the axis of the photobraphic lens, and where it can be fastened by tightening thumb screw 20.

Within the branch 15 near the middle thereof is slidably mounted a sleeve 22 carrying a pane of ground glass 23 that has associated with it an opaque frame or mask 24 which makes the "sight" of said pane the same size as that of the image or picture projected on to the film strip, film or the like through the exposure opening of the camera by the lens. That is, the size of the opening of mask 24 is the same as that of the exposure opening of the camera. When the prism occupies its operative position as shown in Figure 3 the middle of its oblique side is coincident with the axis of the photographic lens, said axis being represented by the broken line $x$—$x$, and this point is also coincident with the axis of branch 15. The parts of the camera are preferably so organized and arranged that the distance from this point of intersection to the ground glass 23 is the same as the distance from this point to the film strip within the camera.

As will be clear, the oblique side of the prism 17, when in operative position, reflects the light rays coming from the lens onto the ground glass 23 as indicated by the arrows in Figure 3, and the image on the glass can be seen by the photographer from his position at the outer end of branch 15. Thus the photographer is enabled to point or sight, as well as focus, the camera by means of the reflector 17 and ground glass 23.

The sleeve 22 is provided at one side thereof with a threaded hole occupied by a screw 25 projecting laterally through a slot 26 provided in the wall of branch tube 15. This construction provides for adjustment of the ground glass toward and from the prism to an extent sufficient to permit accurate positioning of the glass with respect to the latter.

Within the outer end of the branch tube 15 I may, as shown, provide a magnifying glass including a lens 27 secured within a sleeve 28 by means of a ring nut 29 having screw thread engagement with said sleeve. The sleeve 28 is slidably mounted within the outer end of the branch tube 15 and at one side thereof is provided with a threaded hole occupied by a thumb screw 30. This thumb screw extends laterally through a spiral slot 31 provided in tube 15 and when said screw is loose it may be used as a handle whereby to rotatably adjust the sleeve of the magnifying glass so that the spiral slot will shift the latter toward or from the ground glass to focus the lens 27 on the glass 23.

The ring nut 29 may, as shown, be made at its outer end with a knurled finger flange which may also be used, if desired, in adjusting the magnifying glass.

The ground glass 23 and the opaque frame 24 are secured within the sleeve 22 by means of a ring nut 32 having threaded engagement with the interior of said sleeve.

The inner end portion of the tubular extension 15 extends through the main body 11 of the lens holder and is fixed to the latter with light tight joints so that it is, in effect, part of it, holes 32 and 33 being made through opposite sides thereof to permit the passage therethrough of the light rays from the photographic lens. This inner end of the tubular extension is internally threaded to receive within it an externally threaded cap 34 for closing said end.

While I have herein used a prism as the reflecting means, it will be understood that any other suitable reflecting means may be employed in lieu thereof.

The mode of operation is as follows:— After the body 11 has been attached to the camera by one end and has received a photographic lens in a focusing mount 12 at the opposite end thereof, the optical reflector 17 is moved into the main body 11 by the knob or thumb screw 20. The photographer, by looking through the magnifier 27, observes on the ground glass 23 the image produced by the photographic lens and reflected by the reflector 17, and by manipulating the focusing device of the photographic lens mount, and by turning the whole camera about, he can select the objects he wishes to include in the picture, and position and focus the same on the ground glass. As soon as the desired result is obtained, the image as seen on the ground glass 23 can be made to appear on the sensitive film at the exposure opening of the camera in the identical position and same sharp focus by shifting the reflector laterally into the branch 15, thereby presenting a free passage for the light rays from the lens to the film. This operation requires only a very short time and may be repeated as often as it becomes necessary to check the focus of the lens on account of changes in the distance or position of the object.

What I claim is:

1. In a camera, the combination of a tubular member connected at one end to the casing of the camera and made intermediate its ends with a fixed tubular extension projecting laterally therefrom and formed with a longitudinal slot; a photographic lens connected with the opposite end of said tubular member in axial alignment with the latter; a slide movably mounted within said tubular extension having an operating arm extending through the slot of the latter to the exterior thereof by means of which said slide is shifted longitudinally in said extension in either direction, and a reflector on said slide that is moved radially with respect to said tubular member into and out of a position of alignment with said lens by adjustment of said slide within said tubular extension.

2. A camera constructed in accordance with claim 1 and including a pane of ground glass fixedly mounted within said tubular extension on to which the rays of light from the lens are directed by said reflector when the latter is in alignment with said lens.

3. A camera constructed in accordance with claim 1 and including a pane of ground glass fixed within said tubular extension on to which the rays of light from the lens are directed by said reflector when the latter is in alignment with said lens, and a magnifying glass carried by the outer end portion of said extension and in axial alignment therewith through which to view the image on said ground glass.

4. A camera constructed in accordance with claim 1 wherein said operating arm is a clamping screw having threaded engagement with said slide and by means of which the latter is also fixed in adjusted position.

5. As a new article of manufacture, a tubular member whereof one end is provided with means for connecting the same to a camera and the opposite end is provided with means for holding a lens mount in axial alignment therewith, said tubular member being made intermediate its ends with a tubular extension projecting laterally therefrom and formed with a longitudinal slot; a slide movably mounted within said tubular extension having an operating arm extending through the slot of the latter to the exterior thereof by means of which said slide is shifted longitudinally back and forth in said extension, and a reflector on said slide that is moved radially with respect to said tubular member into and out of a position of alignment with said lens by adjustment of said slide within said tubular extension.

6. A camera constructed in accordance with claim 1 wherein said reflector is shifted into and out of said tubular member by the movements of said slide within said extension.

EMIL M. MUELLER.